June 5, 1945.　　　　C. D. MACGILL　　　　2,377,797
SIGHT FOR GUNS
Filed Jan. 31, 1942
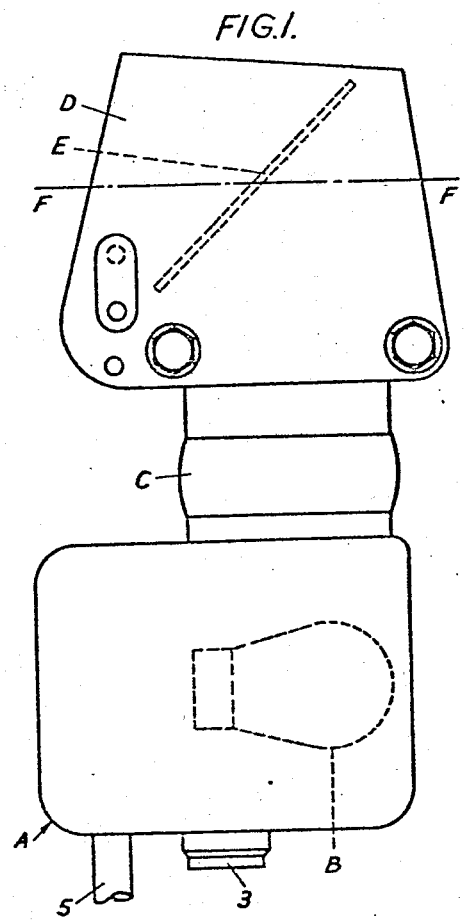
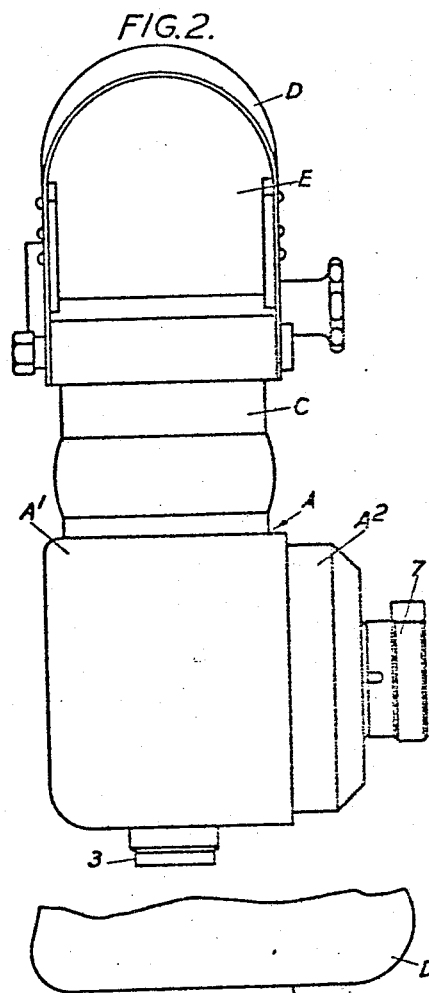
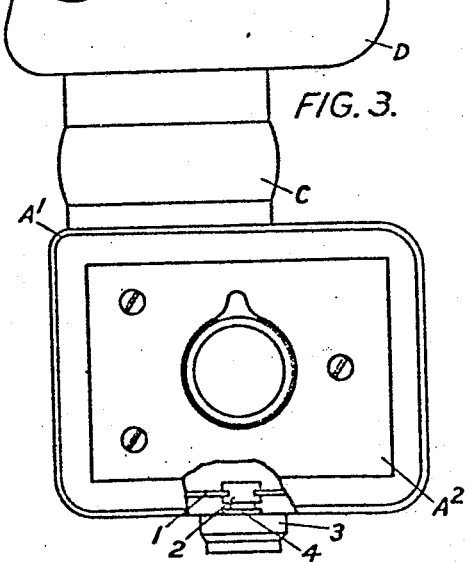
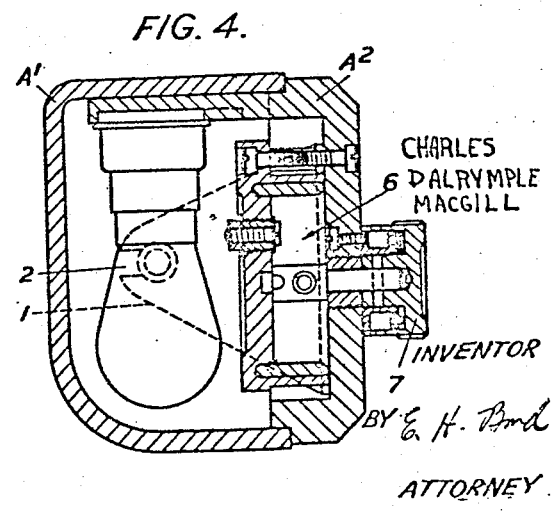
INVENTOR
CHARLES DALRYMPLE MACGILL
BY E. H. Bond
ATTORNEY Patented June 5, 1945

2,377,797

UNITED STATES PATENT OFFICE 2,377,797

SIGHT FOR GUNS

Charles Dalrymple Macgill, Glasgow W. 3, Scotland, assignor to Barr & Stroud, Limited, Glasgow, Scotland Application January 31, 1942, Serial No. 429,080

3 Claims. (Cl. 240—2)

This invention refers to gun sights of the reflector type, i. e., comprising a transparent screen arranged obliquely to the observer's line of sight to the object under observation, and through which the observer views that object, and a lamp which projects light from a graticule in a direction substantially at right angles to the line of sight on to the screen so that an image of the graticule is formed in the observer's line of sight as a result of reflection at the oblique screen, to which image the observer refers the object for sighting purposes.

In sights with which this invention is concerned, the lamp and other elements are enclosed in a lamp casing forming part of the sight. It is necessary that the lamp and associated elements should be readily accessible, for example, in order to allow of the lamp being replaced in the event of breakage.

According to this invention, in a sight of the reflector type as above defined, the lamp casing comprises a part which is fixed in the sight and a complementary part which is attachable to and separable and removable from the fixed part, with detent means for locking the two parts together and disengageable by finger action to release the two parts, the removable part of the lamp casing carrying the lamp in such a way as to locate the lamp in proper position for use in the casing when the two parts of the casing are attached. Thus, on removal of the removable part of the lamp casing, the lamp is withdrawn from the sight and can be readily replaced.

A sight according to the invention may be provided with manually operated means for varying the brightness of illumination given by the lamp, and in that case preferably the said means are also carried by the removable part of the lamp casing along with the lamp. Such means may take the form of a finger-operated rheostat. Further, the electric connections for the supply of current to the lamp may be attached to the removable part of the lamp casing so that the whole of the electric system is removable from the sight with the removable part of the casing.

The invention will now be described with reference to the accompanying drawing, in which:

Figure 1 is a side elevation showing a sight of the reflector type, as a whole,

Figure 2 is an elevation at right angles relative to Figure 1,

Figure 3 is a side elevation of the lamp casing portion of the sight from the opposite side relative to Figure 1, and Figure 4 is a sectional plan view through the lower part of the sight.

The sight comprises a lamp casing A, a lamp B within the casing A, a tubular body C extending upwards from the casing A, a hood or cover D of thin metal mounted on the tubular body C, and a transparent glass plate E mounted obliquely in the hood D. In use, the observer's eye is to the right in Figure 1 and he views the object under observation directly through the glass plate E. Light from the lamp B is projected upwards by way of a graticule (not shown) through the tubular body C and is reflected at the glass plate E, as a result of which an image of the graticule appears in the observer's line of sight F—F to the object. To this image the observer refers the object for sighting purposes.

As shown in Figures 3 and 4 the lamp casing A is of box-shape and comprises two parts $A^1$ and $A^2$, the part $A^1$ being a fixture in the sight and the part $A^2$ being removable from the sight and fitting on to the part $A^1$. At the base of the removable part $A^2$ there is a projecting retaining plate 1 of substantially triangular form with a key-hole slot 2 at its vertex. In the base of the fixed part $A^1$ there is a spring-pressed stud or plunger 3 with an annular recess 4 in it. When the part $A^2$ is in place in the part $A^1$, the head of the stud 3 is in engagement with the inner part of the key-hole slot 2, preventing withdrawal of the part $A^2$. If, however, the stud 3 is pressed upwards against spring action till the recess 4 registers with the retaining plate 1, the part $A^2$ can be withdrawn from the part $A^1$.

The part $A^2$ carries the lamp B, the electric lead 5 for the supply of current to the lamp, and a rheostat 6 with an operating head 7 for varying the brilliance of the lamp, so that on release of the detent device 1, 2, 3, these electrical elements can be withdrawn as a whole with the removable part $A^2$ of the lamp casing A, giving ready access to these elements.

I claim:

1. A gun sight of the reflector type as defined including an electric lamp, a socket therefor and a box-like lamp casing, the lamp casing comprising a major wall part which is fixed in the sight and a complementary wall part made separate from said major part and of approximately the same wall thickness, and spring detent means for locking the complementry part to the major part to complete the lamp casing, with a finger-piece for releasing said detent means by a single movement of said finger-piece, the complementary part having a bracket which extends within the major part and which carries the socket and lamp transversely to the direction of projection of light from the lamp casing and at right angles to said bracket.

2. A gun sight of the reflector type as defined including an electric lamp, a socket therefor and a box-like lamp casing, the lamp casing comprising a major wall part which is fixed in the sight and a complementary wall part made separate from said major part and of approximately the same wall thickness, and spring detent means for locking the complementary part to the major part to complete the lamp casing, with a finger-piece for releasing said detent means by a single movement of said finger-piece, the complementary part having a bracket which extends within the major part and which carries the socket and lamp transversely to the direction of projection of light from the lamp casing and at right angles to said bracket, there being also a rheostat for regulating the brightness of the lamp carried by and on the interior face of the complementary part between said face and the lamp.

3. A gun sight of the reflector type as defined including an electric lamp, a socket therefor and a rectangular box-like lamp casing, the lamp casing comprising a major wall part which is fixed in the sight and a complementary wall part made separate from said major part and of approximately the same wall thickness, and spring detent means for locking the complementary part to the major part to complete the lamp casing, with a finger-piece for releasing said detent means by a single movement of said finger-piece, the complementary part having a bracket which extends within the major part and which carries the socket and lamp transversely to the direction of projection of light from the lamp casing and at right angles to said bracket.

CHAS. D. MACGILL.